United States Patent [19]

Lepesant et al.

[11] 4,409,039

[45] Oct. 11, 1983

[54] HIGH STABILITY PRINTING LIQUID, INTENDED MORE PARTICULARLY FOR PRINTING BY INK JET

[75] Inventors: Jean P. Lepesant; Georges Tantot, both of Paris, France

[73] Assignee: Societe IMAJE, Bourg-les-Valence, France

[21] Appl. No.: 244,909

[22] Filed: Mar. 18, 1981

[30] Foreign Application Priority Data

Mar. 21, 1980 [FR] France .................... 80 06400

[51] Int. Cl.$^3$ .................................... C09D 11/02
[52] U.S. Cl. .............................. 106/20; 106/22
[58] Field of Search .................... 106/22, 23, 20

[56] References Cited

U.S. PATENT DOCUMENTS

| | | | |
|---|---|---|---|
| 4,155,767 | 5/1979 | Specht et al. | 106/22 |
| 4,165,399 | 8/1979 | Germonprez | 427/260 |
| 4,256,493 | 3/1981 | Yokoyama et al. | 106/22 |

FOREIGN PATENT DOCUMENTS

| | | |
|---|---|---|
| 466207 | 12/1964 | Fed. Rep. of Germany . |
| 56-6166274 | 12/1981 | Japan . |
| 1097461 | 1/1968 | United Kingdom . |

OTHER PUBLICATIONS

*J. Chem. Phys.* 69(7), pp. 3279–3288, (1978).
IBM Technical Disclosure Bulletin, vol. 18, #2, Jul. 1975, N.Y.

*Primary Examiner*—John Kight, III
*Assistant Examiner*—Amelia B. Yarbrough
*Attorney, Agent, or Firm*—Oblon, Fisher, Spivak, McClelland & Maier

[57] ABSTRACT

The invention relates to a high stability printing liquid, intended more particularly for printing by ink jet.

The ink is in the state of a micro-emulsion formed by a dispersing phase containing a group of inter-compatible constituents and a dispersed phase containing a second group of inter-compatible constituents, the constituents of the first and second groups being incompatible with one another. These two phases are separated by an interfacial liquid containing surfactant molecules in such a way that the dispersed phase is in the form of globules of 500 to 1000 Angstrom.

The invention is more particularly applicable to printing by ink jet.

24 Claims, No Drawings

HIGH STABILITY PRINTING LIQUID, INTENDED MORE PARTICULARLY FOR PRINTING BY INK JET

BACKGROUND OF THE INVENTION

The invention relates to a high stability printing liquid, intended more particularly for printing by ink jet, requiring the use of a fluid printing liquid which is stable over a long period of time.

In certain applications of printing liquids of this type and particularly in the case of printing by ink jet, it is necessary to pass the ink through small diameter orifices, for example having a diameter of a few dozen micrometers, in order to obtain by breaking up of the jet ink droplets which, when projected onto a substrate make it possible to obtain spots with a diameter of approximately 100 to 300 micrometers. This is in particular necessary for obtaining a high density of points, characterized by the number of points per unit of length, which is called the printing resolution.

In general, there are problems regarding the moisture resistance of the printing when using hydrosoluble dyes, many of them containing metallic-ferrous groups. Thus, preference is given to the use of dyes which are soluble in an organic medium.

The use of the small diameter orifices referred to hereinbefore is not in itself sufficient for obtaining the sought high resolutions. In addition, the geometrical arrangement of the orifices must make it possible to obtain the sought resolutions over the complete surface to be printed. The small dimensions of the orifices and the large number of points sought generally make it difficult to obtain such geometrical arrangements, when each orifice only makes it possible to print a single point. It is then often advantageous to be able to print several points with each orifice. This can be obtained by moving the printing substrate and/or the orifices and by imposing different paths or trajectories on the drops issuing from the same orifice.

A convenient way to impose different paths or trajectories on the drops consists of a transfer of electrical charges thereto and a deflection of these charged drops by an electrical field. The electrical charge transfer can only be obtained if the printing liquid has an adequate electrical conductivity. This is particularly the case when the electric charge transfer time is only a few microseconds.

A printing liquid, which is often called ink in the remainder of the description, must be stable over a period of time and must be usable at any time for forming jets of droplets by passing through orifices with a diameter of only 5 to 100 micrometers. This generally eliminates the possibility of using coloured pigments which easily form aggragates of size sufficient to bring about a partial or total clogging of the orifices. Such a liquid must also lead to an adequate electrical conductivity being obtained to permit the transfer of an electrical charge to the droplets at the time when they form by separation from the jet. Moreover, the printing must dry rapidly and it must have an adequate resistance to moisture and friction. Finally, this liquid or ink must lead on the one hand to obtaining an optimum optical contrast, requiring the use of dye quantities which may, for example, be between 5 and 20% by weight of the total weight, and on the other hand to a limitation of the spread and diffusion of the dye on and/or into the substrate to obtain clearly defined and reproducible dimensions, geometry and optical contrast.

These problems are difficult to solve, particularly as these requirements are often confronted by other contradictory requirements. Thus, as the conductivity must be high it is necessary to use relatively large amounts of water to ensure a good dissociation of the electrolyte, which makes it possible to adjust this conductivity. However, organosoluble metalliferrous dyes (which alone are able to give an adequate optical contrast) do not tolerate the addition of water and over a longer or shorter term there is a danger of flocculation.

BRIEF SUMMARY OF THE INVENTION

The problem of the present invention is to solve all these problems and relates to a printing liquid whose composition ensures an organisation of the constituent molecules such that it contributes in a determinative manner to the stability over a period of time of said liquids and in particular prevents any flocculation of one or more constituents. It more particularly relates to a printing liquid, specifically used in printing by ink jet, wherein the microscopic structure, called a micro-emulsion is constituted by a dispersing phase and a dispersed phase separated from one another by an interfacial film, which isolates the constituents of the two normally incompatible phases in such a way that any risk of flocculation is permanently prevented.

DETAILED DESCRIPTION OF THE PREFERRED EMBODIMENTS

The invention is described in greater detail hereinafter relative to preferred embodiments.

According to the invention, a printing liquid or ink is constituted by a physical system leading to the separation into two parts or phases of the ink constituents. The first phase is called the dispersing phase and the second phase the dispersed phase.

The dispersing phase contains a first group of inter-compatible components and the dispersed phase also contains a second group of inter-compatible components. However, said first and second groups of components are not inter-compatible. The liquid according to the invention is in the state of a micro-emulsion having a dispersed phase formed from globules, whose dimensions are preferably between 500 and 1000 Angstrom, separated from the dispersing phase by an interfacial film, whose function is to prevent the normally incompatible constituents of each of the phase from interacting and producing flocculation. Such a structure of the ink leads to the latter having a particular high stability.

The choice of constituents permitting the formulation of an ink according to the invention is defined in that it respects on the one hand the constraints linked with the use of said ink particularly for printing by ink jet, and on the other hand it corresponds to the establishment of structures typical of the micro-emulsion state.

According to a preferred variant of a printing liquid or ink according to the invention, the physical system used makes it possible to separate the ink constituents into two phases, namely a first phase constituted by a highly polar solvent, such as e.g. water and optionally electrolyte and a second phase constituted by an organic solvent and a dye.

In the examples described, this first aqueous phase constitutes the dispersing phase of the microemulsion and the second phase constitutes the dispersed phase. According to the invention and as stated hereinbefore these two phases are separated by an interfacial film. The latter is a substance containing surfactant molecules, essentially located in the interfacial layer surrounding each of the globules of the dispersed phase and separates their content from the dispersing phase. These surfactants can be ionics, such as e.g. sodium dodecyl sulphate (SDS) or nonionic such as Sunaptol, which is an ethoxylated nonyl phenyl manufactured by Ugine Kuhlmann. In the case where the interfacial film contains anionic or cationic surfactant molecules, the micro-emulsion intrinsically has a high electrical conductivity on a macroscopic scale for certain concentration values. Furthermore, this conductivity can be optimized by the addition of electrolyte, in the manner described hereinafter.

The dyes are chosen so as to be permanently soluble in the phase containing the organic compounds. It may, for example, be a chrome complex azo dye, marketed under the trade name ORASOL CN black or RL black by CIBA-GEIGY.

The maximum solubility range of these dyes corresponds to substances or mixtures with a moderate polarity and to a hydrogen bond with an average bonding force. Light ketones are particularly suitable as solvents for these dyes and in addition have the advantage of leading to correct evaporation speeds. For example, they can be light aliphatic ketones such as methyl ethyl ketone (MEK), methyl isobutyl ketone (MIBK) or cyclohexanone.

As stated hereinbefore, the structure of the inks is in the form of micro-emulsions according to the invention, so that in itself it has a by no means negligible conductivity. However, for certain applications, the conductivity value must be raised and in general terms adjusted as a function of a certain number of criteria, particularly according to the way in which the devices using this type of ink operate. To achieve this result, it is necessary to incorporate into the aqueous phase of the emulsion, i.e. in the present case into the dispersing phase, small quantities of electrolyte, such as e.g. dimethylammonium chloride (DMHC), alkali metal or alkaline earth halides (LiCl, NaCl, $CaCl_2$) or alkali metal acetates (sodium or ammonium). Bearing in mind that the micro-emulsion state in itself produces a certain conductivity, it should be noted that only small electrolyte quantities are used, which constitutes an important advantage.

Different ink compositions according to the invention are given in the following table I as non-limitative examples. A given resistivity in Ohm/cm corresponds to each of these compositions. There are two types of examples, with and without the use of DMHC. A first type of said liquids contains in nominal manner a proportion by weight of 45.0% water, 5.8% SDS, 35.4% MEK and 13.8% ORASOL black. A second type of such liquids nominally contains 43.5% water, 39.3% MEK, 5.8% SDS, 1.0% DMHC and 10.4% ORASOL black. All these proportions can vary by 10% from the nominal value.

TABLE I

The proportions are given by weight and for each example, the resistivity $\rho$ in Ohm/cm is given.

| SDS | Water | MEK | Dyes | DMHC | Ohm-cm |
|---|---|---|---|---|---|
| 6 | 43.6 | 35.1 | 15.1 | / | 160 |
| 5.7 | 46.5 | 37.4 | 10.3 | / | 180 |
| 5.9 | 46.1 | 37.1 | 9.1 | 1.8 | 90 |
| 5.7 | 43.7 | 39.6 | 9.9 | 1.1 | 100 |
| 5.8 | 43.5 | 39.3 | 10.4 | 1.0 | 100 |

TABLE I-continued

In certain applications where a moderate conductivity is adequate, it is possible to prepare inks in the form of micro-emulsions according to the invention by using a nonionic surfactant. According to a first variant, the printing liquid nominally contains a weight proportion of 63.1% water, 25.4% MIBK, 6.3% Sunaptol and 5.2% ORASOL CN black. These proportions can vary by 10% from the nominal value. In a second variant, the printing liquid nominally contains a weight proportion of 56% water, 30.2% MIBK, 13.2% Sunaptol and 0.6% ORASOL CN black. No matter what the composition chosen, such a system according to the invention is macroscopically homogeneous and stable over a period of time and prevents any precipitation of the constituents. The dispersed phase is distributed into globules, as stated hereinbefore. These globules have sufficiently small dimensions to be in a state of dynamic stability due in particular to the phyisco-chemical interactions (interfacial tension, energy of curvature, adsorption force) and to the Brownian energy. As a result of the small dimensions of the globules, the system can have a homogeneous behaviour on elements with a volume greater than a few dozen cubic micrometers.

Therefore, one of the main applications of the ink according to the invention is in the field of printing by ink jet.

What is claimed is:

1. A printing liquid useful in jet ink printing processes which require inks which are macroscopically homogeneous and stable over long periods of time, comprising:
   a liquid having the structure of a microemulsion comprising a dispersing phase and a dispersed phase, said phases being separated from one another by an interfacial film which isolates the constituents of the two phases in such a way that any danger of flocculation is avoided.

2. The printing liquid according to claim 1, wherein the dispersed phase is in the form of globules of dimensions between 500 and 1000 Angstrom.

3. The printing liquid according to claim 1 or 2, wherein the dispersing phase is constituted by a first group of inter-compatible components and the dispersed phase is constituted by a second group of inter-compatible components, whilst the first and second group of constituents are not inter-compatible.

4. The printing liquid according to claim 1, wherein the interfacial film contains anionic or cationic surfactant molecules.

5. The printing liquid according to claim 1, wherein the interfacial film contains nonionic surfactant molecules.

6. The printing liquid according to claim 3, wherein the first group of inter-compatible constituents contains a polar solvent.

7. The printing liquid according to claim 6, wherein this polar solvent is water.

8. The printing liquid according to claim 3, wherein the second group of constituents comprises a volatile organic solvent which is incompatible with the polar solvent and a dye which is soluble in said organic solvent.

9. The printing liquid according to claims 7 or 8, wherein the electrolyte is dimethylammonium chloride.

10. The printing liquid according to claim 8, wherein the electrolyte is a sodium or ammonium acetate.

11. The printing liquid according to claim 8, wherein the volatile organic solvent is a light aliphatic ketone.

12. The printing liquid according to claim 11, wherein this ketone is methyl ethyl ketone.

13. The printing liquid according to claim 11, wherein this ketone is methyl isobutyl ketone.

14. The printing liquid according to claim 11, wherein this ketone is cyclohexanone.

15. The printing liquid according to claim 8, wherein the dye is a chrome complex azo dye.

16. The printing liquid according to claim 4, wherein the interfacial film is constituted by sodium dodecyl sulphate.

17. The printing liquid according to claim 5, wherein the interfacial film is an ethoxylated nonyl phenol.

18. The printing liquid according to claim 4, which has a macroscopically high electrical conductivity.

19. The printing liquid according to claim 6 or 7, wherein said ink further comprises an electrolyte.

20. The printing liquid according to claim 7, wherein said liquid nominally contains a weight proportion of 45% water, 5.8% sodium dodecylsulfate, 35.4% methylethylketone and 13.8% of a black dye, whereby said proportions can vary by 10% from the nominal values.

21. The printing liquid according to claim 7, wherein said liquid nominally contains a weight proportion of 43.5% water, 39.3% methylethylketone, 5.8% sodium dodecylsulfate, 1.0% dimethylammonium chloride and 10.4% black dye, said proportions being able to vary by 10% from their nominal values.

22. The printing liquid according to claim 7, wherein said liquid nominally contains a weight proportion of 63.1% water, 25.4% methylisobutylketone, 6.3% ethoxylated nonyl phenol and 5.2% black dye, said proportions being variable by 10% from the nominal values.

23. The printing liquid according to claim 7, wherein said liquid nominally contains a weight proportion of 46% water, 30.2% methylisobutylketone, 13.2% ethoxylated nonyl phenol and 0.6% black dye, said proportions being variable by 10% from their nominal values.

24. A printing liquid useful in jet ink printing processes which require inks which are macroscopically homogeneous and stable over long periods of time, comprising:

a liquid having the structure of a micro-emulsion comprising an aqueous dispersing phase containing water in an amount of 43.5% to 63.1% and optionally and electrolyte and a dispersed phase containing a dye and an organic solvent, said phases being separated from one another by an interfacial film which isolates the constituents of the two phases in such a way that any danger of flocculation is avoided.

* * * * *